Patented Apr. 7, 1953

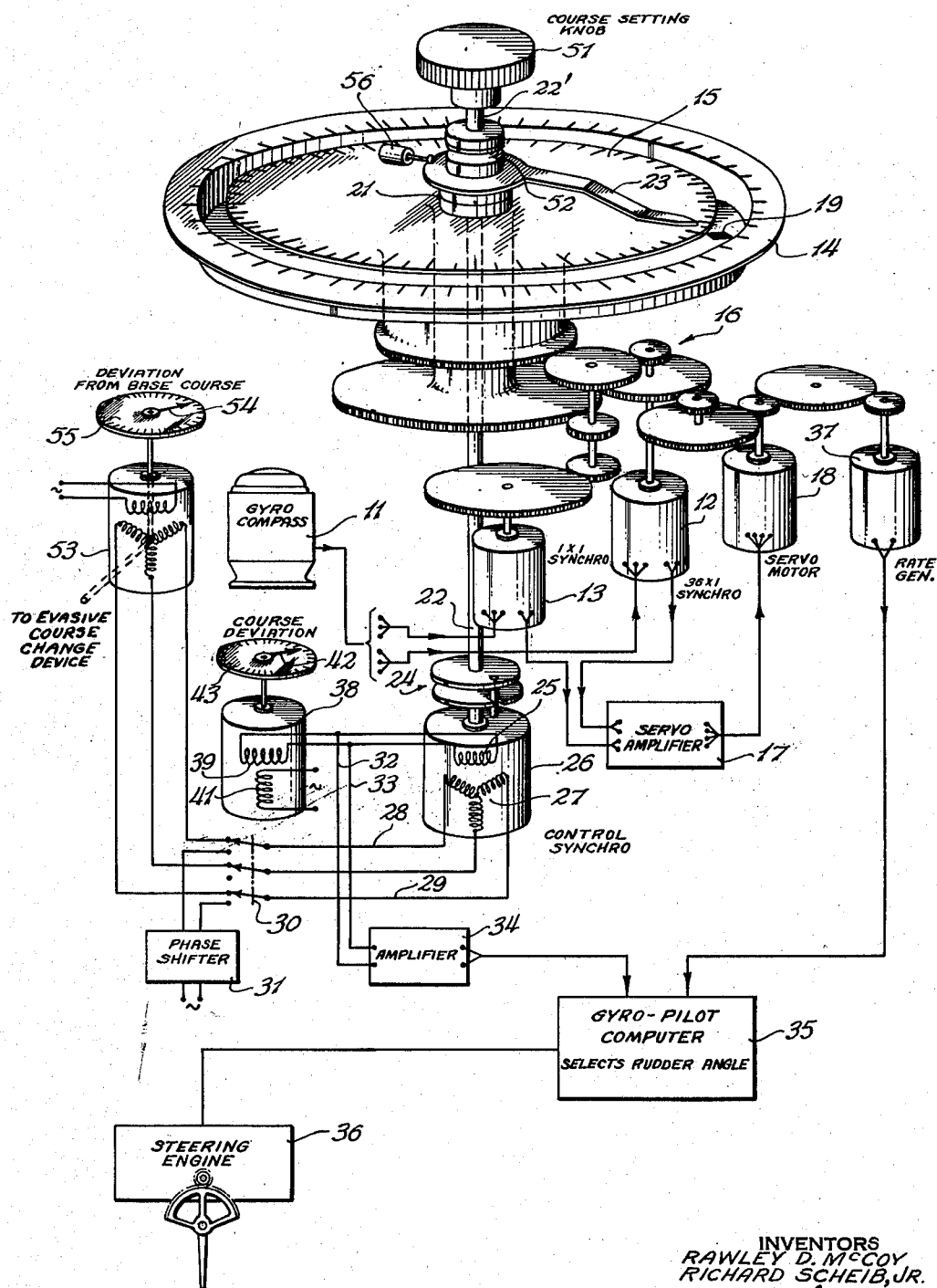

2,634,067

UNITED STATES PATENT OFFICE 2,634,067

COURSE SELECTOR SYSTEM

Rawley D. McCoy, Bronxville, and Richard Scheib, Jr., Hempstead, N. Y., assignors to The Sperry Corporation, Great Neck, N. Y., a corporation of Delaware Application July 16, 1948, Serial No. 39,004

2 Claims. (Cl. 244—77)

This invention relates to automatic craft guidance equipment, and, more particularly, concerns a course selector system whereby the craft may be made to proceed to, and maintain, any preselected heading.

A particular feature of the instant invention resides in the provision of a course selector system wherein signals responsive to manually settable means, or responsive to the output from evasive tactics mechanisms, may be utilized to cause the craft to assume a particular course. Also, means are provided affording a continuous indication of present craft heading (or average course being followed in the event evasive tactics are being employed).

A primary object of the instant invention is to provide means indicating the present position of the craft, together with means associated with the present position indication, whereby a course changing signal may be introduced to cause the craft to pursue a direction other than the present direction.

A further object is to provide a course selector system, capable of indicating the average course being followed during the application of course variations, such as would be provided by an evasive tactics mechanism.

Another object is to provide, in a course selector system, an indicating means that is responsive to the actual deviation of the craft from the desired course.

Further objects and advantages of the present invention will become apparent as the description of the drawing in which a preferred embodiment of the invention is illustrated proceeds.

Referring now to the drawing, a directional reference, shown here as a gyrocompass 11, provides ship's heading data, from which fine and coarse signals may be derived. The transmitter of the coarse signal is ordinarily connected directly with the data input, or reference member, so that the rotor of the transmitter rotates in a 1:1 ratio with respect thereto. The rotor of the fine transmitter, is rotated at some fixed higher ratio, such as 36:1 with respect to the reference member. The fine and coarse signal transmitters though not illustrated, are connected respectively, to the 36:1 synchro receiver 12, and to the 1:1 synchro receiver 13, which synchros, in turn, have their rotors positioned in rotation by the fine dial 14, and the coarse dial 15, through the gear train generally identified at 16. Upon disagreement between the rotors of the fine and coarse synchro receivers 12 and 13 from the rotational position of the rotors of their corresponding transmitters, signals that are responsive to that deviation will be created and, when properly mixed in the servo amplifier 17, will serve to energize the servomotor 18, to thereby position the fine and coarse dials 14 and 15, through the gear train 16. Such inter-connecting elements provide a means for normally synchronizing the pointer 23 and direction defining means or gyrocompass 11. Details of the circuit of amplifier 17 may be obtained from U. S. Letters Patent No. 2,620,441, issued December 2, 1952, to McCoy and Kusto for an Electronic Signal Mixing Circuit. A lubber line 19, positioned to be fixed relative to the craft and thereby representing craft heading, will continuously point to the position on the fine and coarse dials to the course that the craft is presently pursuing. A friction coupling 21 is rotatable about shaft 22 and has two sections, one secured to rotate with the coarse dial 15, and the second secured to rotate with course selector pointer 23.

Normally, and by virtue of the friction coupling 21, pointer 23 will be caused to rotate with the coarse dial 15, and shaft 22 being secured to the pointer 23 will also normally be caused to rotate with coarse dial 15 and pointer 23. Coupling means 24 serves to secure the shaft 22 to the rotor 25 of control synchro 26. Thus, the course selector pointer 23 is directly coupled to the rotor 25 of the control synchro 26, and course selector pointer 23 is friction coupled to the coarse, or 1:1, dial 15. The stator 27 of the control synchro 26 is fixed relative to the craft on which it may be mounted. In automatic steering, the switch 30 is placed in the position whereby two stator leads 28 and 29 are excited from the line after appropriate phase shift within the phase shifter 31.

Upon deviation of the craft from any preset course, the course selector pointer 23 will deviate from the reference lubber line 19, and rotor 25 of control synchro 26 will be rotated relative to the fixed stator 27, resulting in the creation of a course error signal. This course error signal will be transmitted by the lines 32, 33 to be amplified in amplifier 34 and supplied to the gyro pilot computer 35. The course error signal together with a ship's turning rate signal (to be presently described), computes a signal which is proportional to the proper rudder angle, and when this latter signal is supplied to an appropriate steering engine 36, a rudder angle will thereby be set in that will cause the craft to return to its preset course. The above referred to ship's turning rate signal is generated by the rate generator 37, which may comprise an eddy current or other suitable generator, and is rotated by the servomotor 18, the action of the servomotor 18 having been previously described herein.

In order to afford the operator of the craft complete information relative to the present craft position, a course or heading deviation meter 38 is provided, having two quadraturely displaced windings, one winding 39 energized in accordance with the course error signal, and, in this instance, having its other winding 41 energized by the line. When a course error signal is created, winding 39 will be energized in accordance with that signal and pointer 42 will be caused to rotate relative to dial 43 to thereby indicate the extent of the course deviation.

From the foregoing description, it can be seen that the position of the course selector pointer 23, relative to the lubber line 19 may determine whether or not a course error signal will be created in the control synchro 26. While normally, the course selector pointer 23 is friction coupled to the coarse compass dial 15, if a new course were desired to be set into the system, this new course may be set in in the following manner. Course setting knob 51 is mounted on shaft 22 (which shaft is rotatable about the axis of shaft 22, though not connected therewith) and may be made to engage and thus rotate the course selector pointer 23 upon depressing the course setting knob 51 so that the clutch 52 will cause the course selector pointer 23 to rotate therewith. By proper choice of coefficients for the friction coupling 21, the engagement of the clutch by the course setting knob 51, when depressed, may be made to overcome the friction coupling 21, thereby to cause the course selector pointer 23 to rotate relative to the coarse dial 15.

In other words, since the course selector pointer is friction coupled to the coarse compass dial, setting of this pointer on a desired course will result in the production of a course error signal in the control synchro 26 and this signal will be proportional to the deviation of the selected course from the reference lubber line 19. As the craft, in response to the course error signal thus created, is caused to pursue the new course, the fine and coarse compass repeater dials 14 and 15 will rotate until the new heading arrives opposite the reference lubber line 19, and, by virtue of the friction coupling 21, the course selector pointer will likewise now have been returned to a position opposite to the reference lubber line 19.

Evasive tactics may be introduced into the system by producing rotation of the field of the stator 27 of the control synchro 26. The evasive tactics mechanism or course change device may consist of a clockwork and zigzag course cam apparatus such as shown and described in U. S. Letters Patent No. 1,497,059, issued June 10, 1924, to Lindell T. Bates. This mechanism provides a predetermined zigzag course for the craft. While the nature of evasive tactics signals is not a part of the instant invention, the system that is disclosed lends itself to the introduction of signals of this sort. For example, with switch 30 in the position indicated, a synchro 53 operatively connected to the evasive tactics mechanism may provide an electrical signal that has the same effect in producing course changes of the craft through the steering engine as the rotation of rotor 25 of control synchro 26. Furthermore, the synchro 53 may be made to create the evasive tactics signals in response to physical displacements therein, resulting in changed relationships between the rotor and stator of synchro 53, or in response to electrical impulses which have the effect of changing the relationship between the rotor and stator of synchro 53. An indication of the desired deviation from the base course, as established by the position of the course selector pointer 23, during an evasive tactics maneuver, may be obtained at synchro transmitter 53 by attaching a pointer 54 readable on dial 55 to the shaft thereof.

A detent mechanism 56, is provided and is arranged to engage and secure the course selector pointer to the lubber line 19 to insure that the relative positions of two members remain unaltered during conventional hand-electric steering. Thus, when the automatic control is first reestablished, no difficulty will be experienced from misalignment of these members that would otherwise take place.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a course selector system for dirigible craft, the combination of, direction defining means, a course selector pointer, synchronizing means normally interconnecting said pointer and direction defining means, an electrical signal transmitter having a rotor connected to said pointer and a stator fixedly connected to the craft, means for providing a predetermined zigzag course for the craft including an evasive tactics mechanism, circuit means for connecting said evasive tactics mechanism and the stator of the signal transmitter including a switch, and a steering engine for the craft operatively connected to said signal transmitter.

2. In a course selector system for dirigible craft, the combination of, direction defining means, a course selector pointer, synchronizing means normally interconnecting said pointer and direction defining means, manually operable means for changing the course of the craft through said pointer effective to disconnect the normal connection between the pointer and the direction defining means, an electrical signal transmitter having a rotor connected to said pointer and a stator fixedly connected to the craft, means for providing a predetermined zigzag course for the craft including an evasive tactics mechanism, circuit means for connecting said evasive tactics mechanism and the stator of said signal transmitter including a switch, and a steering engine for the craft operatively connected to said signal transmitter.

RAWLEY D. McCOY.
RICHARD SCHEIB, JR.

REFERENCES CITED

The following references are of record in the file of this patent:

UNITED STATES PATENTS

| Number | Name | Date |
|---|---|---|
| 1,360,694 | Sperry | Nov. 30, 1920 |
| 1,497,059 | Bates | June 10, 1924 |
| 1,585,210 | Roux | May 18, 1926 |
| 1,617,310 | Sperry | Feb. 8, 1927 |
| 1,694,237 | Simonds | Dec. 4, 1928 |
| 1,885,098 | Hill | Oct. 25, 1932 |
| 2,115,498 | Rieper | Apr. 26, 1938 |
| 2,120,950 | Hodgman | June 14, 1938 |
| 2,308,566 | Noxon | Jan. 19, 1943 |

FOREIGN PATENTS

| Number | Country | Date |
|---|---|---|
| 78,908 | Germany | Jan. 10, 1895 |